(12) United States Patent
Colgan et al.

(10) Patent No.: US 6,600,528 B2
(45) Date of Patent: Jul. 29, 2003

(54) INTEGRATED PRISM SHEET FOR IMPROVED VIEWING ANGLE IN DIRECT VIEW COLOR FILTERLESS LIQUID CRYSTAL DISPLAYS

(75) Inventors: Evan G. Colgan, Chestnut Ridge, NY (US); Rama N. Singh, Bethel, CT (US); Yoichi Taira, Tokyo (JP); Robert L. Wisnieff, Ridgefield, CT (US); Fumiaki Yamada, Kanagawa-prefecture (JP)

(73) Assignee: International Business Machines Corporation, Armonk, NY (US)

( * ) Notice: Subject to any disclaimer, the term of this patent is extended or adjusted under 35 U.S.C. 154(b) by 114 days.

(21) Appl. No.: 09/741,466

(22) Filed: Dec. 19, 2000

(65) Prior Publication Data

US 2002/0075427 A1 Jun. 20, 2002

(51) Int. Cl.[7] ............................................. G02F 1/1336
(52) U.S. Cl. ....................................................... 349/95
(58) Field of Search ...................................... 349/95, 65

(56) References Cited

U.S. PATENT DOCUMENTS

| | | |
|---|---|---|
| 4,798,448 A | 1/1989 | van Raalte |
| 5,046,793 A | 9/1991 | Hockley et al. |
| 5,299,289 A * | 3/1994 | Omae et al. ................... 349/10 |
| 5,534,386 A | 7/1996 | Petersen et al. |
| 5,548,349 A | 8/1996 | Mizuguchi et al. |
| 5,600,462 A | 2/1997 | Suzuki et al. |
| 5,631,754 A | 5/1997 | Jannson et al. |
| 5,682,215 A * | 10/1997 | Nishihara et al. ........... 349/106 |
| 5,682,265 A | 10/1997 | Farn et al. |
| 5,764,319 A | 6/1998 | Nishihara |
| 5,781,257 A | 7/1998 | Gal et al. |
| 5,796,499 A | 8/1998 | Wenyon |
| 5,801,795 A | 9/1998 | Ogino |
| 5,859,675 A | 1/1999 | Ogino |
| 6,295,107 B1 * | 9/2001 | Watanabe et al. ........... 349/110 |

FOREIGN PATENT DOCUMENTS

JP    05088162 A  *  4/1993  ......... G02F/1/1335

OTHER PUBLICATIONS

Zimmerman, et al., "36.2: Viewing–Angle–Enhancement System for LCDS", SID95 Digest, pp. 793–796.
Kanayama, et al., 15.1: A New LC Rear–Projection Display Based on the "Color–Grating Method", SID 98 Digest, pp. 199–202.
Miyatake, et al., "Diffusive Layer for Reflective Type LCDs", IDW 99 pp. 403–406.
H. Hamada, "40.3: Invite Paper: Optical Systems for High–Luminance LC Rear Projection", SID 96 Digest pp. 911–914.

* cited by examiner

Primary Examiner—James Dudek
(74) Attorney, Agent, or Firm—Robert M. Trepp

(57) ABSTRACT

A display device provides a first optical device disposed in a light path for spatially separating angularly separated light into color components, and a pixel which receives each of the color components through a sub-pixel. Each sub-pixel controls transmitted light intensity therethrough. A black matrix is formed in operative relationship with the sub-pixels including apertures for receiving the color components. A microstructured layer is disposed in the light path and receives or transmits the color components from or to the apertures of the black matrix. The microstructured layer includes tilted and/or curved surfaces for redirecting laterally shifted color components shifted by the first optical device and may also diffuse light.

26 Claims, 11 Drawing Sheets

INTEGRATED PRISM SHEET FOR IMPROVED VIEWING ANGLE IN DIRECT VIEW COLOR FILTERLESS LIQUID CRYSTAL DISPLAYS

BACKGROUND OF THE INVENTION

1. Field of the Invention

The present invention relates to direct view displays, and more particularly to direct view liquid crystal displays employing integrated prism sheets.

2. Description of the Related Art

Backlight systems in liquid crystal displays (LCDs) tend to be inefficient, with typically only about 5–10% of the light incident on the back being transmitted through the polarizers (40%), open aperture (60%), and the color filters (35%). The operation of a conventional backlight can be understood with reference to FIG. 1.

Referring to FIG. 1, light from a triband cold cathode fluorescent light (CCFL) 10 is directed into the Acrylic light guide 12 by a reflector 15. The light only escapes from the light guide 12 if the angle of incidence at the acrylic/air interface is less than the critical angle. The light guide 12 is in the form of a wedge so that the incident angle of the light at the acrylic/air interface is gradually decreased as it propagates down the light guide by reflecting between the top and bottom surfaces 14 until it is less than the critical angle and escapes. The intensity of the light which escapes is controlled by a pattern of dots 17 printed on the bottom of the light guide 12 where the density of the dots 17 is adjusted to result in a uniform illumination of the display. Any light which exits the bottom of the guide 12 is redirected upward by a white diffuse scattering sheet 16.

The dots 17 cause diffuse scattering which results in more of the light escaping the light guide 12 in the area of the dots 17. The light typically comes out of the light guide 12 with a peak brightness at about a 70 degree angle from the normal to the display. A ridge collimating film sheet or sheets 20 (see Suzuki et. al. U.S. Pat. No. 5,600,462, for example) are used to redirect the white light so that the peak brightness is normal to the display. Additionally, the light has an appropriate angular distribution (a half brightness at 25 degrees or more off the display normal in both the vertical and horizontal directions) to provide an adequate viewing angle. With 90 degree twisted nematic (TN) mode liquid crystal 28, typically used for portable active matrix liquid crystal displays (AMLCDs), the viewing angle is usually limited by the off-normal contrast ratio and color inversion due to the liquid crystal.

For desktop monitors, a broader distribution of light is desirable: a half brightness at about 40 degrees or more off normal in both the vertical and horizontal directions. Note that it is also desirable to have a wider horizontal than vertical viewing angle. After the ridge sheet(s) 20, the light passes through a back polarizer 24, a thin film transistor (TFT) plate 26, a liquid crystal (LC) layer 28, a color filter plate 22 (in color filter displays), and a front polarizer 30 which reduces the intensity of the transmitted light to only 5–10% of that incident, as described above.

One way of improving the backlight efficiency is to use the combination of a totally internally reflecting light guide, a diffraction grating and lenticular lens to separate the Red, Green, and Blue (RGB) light by angles and then focus the individual colors through the appropriate sub-pixels, see, e.g. the commonly assigned application, to Y. Taira entitled "COLOR FLAT PANEL DISPLAY," PCT Application number JP00/00912, filed Feb. 12, 1999, designating the United States and incorporated herein by reference. This can improve the efficiency by removing the color filters (about 3× improvement) and by focusing the light into the open aperture (about 1.3× improvement). The general operation of the color filterless (CF-less) backlight can be understood with reference to FIG. 2.

Referring to FIG. 2, a light source 112 (CCFL) and reflector 113 direct light into an acrylic light guide 116 which has no printed dot pattern on it so that light can only escape when it's angle of incidence is less than the critical angle. A low index coating 117 (with the refractive index, n, equal to 1.29, for example) along the bottom surface of the light guide 116 results in the light only exiting on a bottom surface 114 of the light guide 116 with a fairly narrow distribution of angles. The CCFL 112 has triband phosphors, so the light produced is mainly in three distinct Red, Green, and Blue bands. A reflective diffraction grating 115 is attached to the low index coating 117 and serves to decompose the white light into the three individual colors and redirect them upward at slightly different angles for each color. Note that a transmissive grating sheet could be used in an alternative configuration in which case no low index coating is required and a mirror sheet is placed below the light guide. A lenticular lens sheet 120 on the bottom of a back polarizer 122 of the AMLCD then focuses the angularly separated RGB light through the appropriate sub-pixels 123. With this approach, the peak intensity for the Red and Blue light is directed at an angle to the display normal. This peak off-normal Red and Blue light will lead to lateral color shifts when viewing the display. A diffuser 121 is included to improve viewing angle.

The lateral color shift problem will now illustratively be described with reference to FIG. 3. Referring to FIG. 3, the optimum focal length of a lenticular sheet 214 is fixed by the sub-pixel pitch of the display and the angular separation between the Red, Green, and Blue light. The Red 202, Green 204, and Blue 206 light are focused through the appropriate sub-pixel apertures by lenticular lens 214. The Red, Green and Blue light is focused through apertures 208 in black matrix 211, but the blue and red light are laterally shifted away from the normal (or Green light). An observer at point "O" would see more blue in the displayed image while an observer at point "P" would observe more red in the displayed image. Polarizers 212 and glass substrates 210 are provided as is known in the art. Note that in some cases, the peak red and blue intensities are not equally separated from the green intensity peak, so it may be desirable to tilt the green light slightly off normal so that the deviation of red and blue from the normal is minimized. In this case, the green light will also have a slight lateral color shift.

A color filterless backlight system has been described by van Raalte in U.S. Pat. No. 4,798,448, entitled HIGH EFFICIENCY ILLUMINATION SYSTEM FOR DISPLAY DEVICES, which used lenticular lens and a transmissive diffraction grating but did not describe any means of correcting for the lateral color shifts when viewing the display.

When microlenses are used for projection displays, as has been described by H. Hamada in "Optical systems for high-luminance LC rear projection", SID '96 Digest, pp. 911–914, a projection lens is used in front of the AMLCD which images the black matrix plane onto the screen and hence no correction of the lateral color shift is needed. For direct view displays, in particular liquid crystal displays, a key attribute is the thickness of the display which should be as thin as possible. The use of dichroic mirrors for the angular separation of the colors, as described by Hamada, requires too much depth to be used and since the displays are viewed directly a projection lens cannot be used to fix the lateral color shift problem. An additional problem with this arrangement in projection displays is that a large projection lens is needed to collect the divergent light. A preferred method of angular color separation may include the combination of a totally internal reflecting light guide and a diffraction grating, as has been described by Taira, cited above since this is very compact and requires no additional space.

The use of combined microlenses and microprisms has been described by Nishihara in U.S. Pat. No. 5,764,319 entitled TRANSMISSIVE DISPLAY DEVICE WITH MICROLENSES AND MICROPRISMS ADJACENT COUNTER ELECTRODE, where the microlens focuses the three primary color components onto each set of three sub-pixels so that the respective color components correctly fall onto the corresponding sub-pixels. The microprisms are located between the corresponding microlenses and the sets of three sub-pixels. The microprisms convert the light ray diverging apart from the optical axis of the microlenses into a substantially parallel light ray. For projection displays, this has the advantage of allowing a smaller projection lens to be used. The microlenses and microprisms are formed on the substrate which contains the counter electrode for the liquid crystal display. For a direct view display, this arrangement is not practical since the substrate which contains the counter electrode also contains the black matrix which is directed toward the viewer to improve the display contrast by reducing reflections. The other substrate which contains the thin film transistor devices is directed toward the backlight so that the only light which is incident on the active channel of the device must first reflect off the bottom of the black matrix so that photoleakage is reduced. Another approach to fixing the lateral color shift problem for direct view displays is to use a diffusing sheet on top of the exit polarizer. Since a diffuser does not redirect the peak brightness of the light but only broadens the distribution, a very large diffusing power is necessary which results in backscattering of the light and loss of efficiency by increasing the viewing angle beyond what is needed. A diffusing sheet also has the great disadvantage that ambient light will be scattered back to the viewer and severely reduce the ambient contrast ratio. A neutral density filter can be used to reduce this backscatter, but such a solution reduces the brightness. A further disadvantage of a diffuser on or under the polarizer, as described by Miyatake et al. in "Diffusive Layer for Reflective Type LCDs," International Display Workshop '99, pp. 403–406, is that the display resolution is reduced since the light transmitted by the sub-pixel apertures expands while propagating through the top substrate to the diffuser. It is desirable to maintain the full resolution of the display.

An additional method for correcting lateral color shift is to use a transmissive hologram as has been described by Wenyon in U.S. Pat. No. 5,796,499, Hockley et al. in U.S. Pat. No. 5,046,793, or a special surface hologram formed with the method, described by Petersen in U.S. Pat. No. 5,534,386, applied in sheet form on top of the exit polarizer, all incorporated herein by reference. Additionally, the transmissive or surface hologram must not only correct the lateral color shift but it must also diffuse light to provide an adequate viewing angle for the display. One disadvantage of any color correcting sheet on the top surface is that the apparent pixel size is increased at that point by the lateral divergence of the Red and Blue light. If the thickness of the polarizers and the front and back glass are the same and if the lenticular lens focuses the light at the center of black matrix (BM) apertures, the apparent pixel size will be increased by ⅔ or more. A further issue for the transmissive hologram approach is that they are difficult and expensive to fabricate. It is not certain that a surface hologram can be fabricated which simultaneously corrects the color shift and provides a wide viewing angle with adequate light transmission.

A surface hologram embedded into a LCD has also been described by Jannson et al. in U.S. Pat. No. 5,631,754, incorporated herein by reference. The microreplication techniques and materials disclosed therein were used for features between the crossed polarizers of a TN cell and this suggests that the birefringence in the replicated structure and material is low enough not to significantly degrade the contrast ratio of the display.

In FIG. 3, if the input plane waves are all exactly parallel, the lenticular on the entrance polarizer adds a divergence of about ±8 degrees in the horizontal direction in the glass. A more realistic case would be to assume that the input light has a slight divergence such as ±2 degrees, but a larger horizontal divergence is not possible or color mixing will occur between the neighboring sub-pixels. In this case, for the configuration of FIG. 3, the overall divergence for the green light in the horizontal direction is about ±10 degrees in the glass, or about ±15 degrees in air. Even for a portable display, a wider horizontal luminance distribution is needed.

Therefore, a need exists for an apparatus which eliminates lateral color shifting, and increases horizontal viewing angle while maintaining the full resolution of a display without reducing ambient contrast ratio for direct view liquid crystal displays.

SUMMARY OF THE INVENTION

A display device provides a first optical device disposed in a light path for spatially separating angularly separated light into color components, and a pixel which receives each of the color components through a sub-pixel. Each sub-pixel controls transmitted light intensity therethrough. A black matrix is formed in operative relationship with the sub-pixels. The black matrix includes apertures for receiving the color components after the pixel. An integrated microstructured layer is disposed in the light path and receives the color components through the sub-pixels. The microstructured layer includes structured surfaces for redirecting laterally shifted color components shifted by the first optical device and optionally further diffusing all color components. The faceted surfaces redirect laterally shifted color components toward a display normal of the display device.

Another display device, in accordance with the present invention, includes a first optical device disposed in a light path for spatially separating angularly separated light into color components. A pixel receives each of the color components through a sub-pixel. Each sub-pixel controls transmitted light intensity therethrough. A black matrix is in operative relationship with the sub-pixels, the black matrix including apertures for receiving the color components after the pixel. A microstructured layer is disposed in the light path of the apertures of the black matrix, the microstructured layer including first faceted surfaces for redirecting laterally shifted color components shifted by the first optical device, the microstructured surface including a plurality of surfaces including at least one of facets, curves and angles surfaces to provide increased viewing angles for the display device.

A liquid crystal display device, in accordance with the present invention, includes a first optical device sheet disposed in a light path for spatially separating angularly separated light into color components. A first substrate has a pixel array disposed thereon, each pixel including three sub-pixels for receiving each of the color components through the sub-pixel. A second substrate is spaced apart from the first substrate by a gap, the gap being filled with liquid crystal material. The second substrate includes a microstructured layer disposed on the second substrate, the microstructured layer including faceted surfaces for redirecting laterally shifted color components shifted by the first optical device sheet, faceted surfaces for redirecting the laterally shifted light toward a display normal. The second substrate includes a common electrode formed on the microstructured layer, and a black matrix layer including apertures patterned in operative relationship with the sub-pixels for receiving the color components through the sub-pixels.

In other embodiments, the color components include red, green and blue, and the microstructured layer includes a first portion which receives a green component and angled portions inclined relative to the first portion for the red and blue components. An overcoat layer may be formed on the microstructured layer wherein the optical index of the microstructured layer is different from the optical index of the overcoat layer such that the color components are shifted in accordance with a difference between the optical index of the microstructured layer and the overcoat layer. The overcoat layer preferably forms a planar surface over the microstructured layer. The display device may include a top plate having a substrate, the microstructure layer formed on the substrate, a common electrode layer formed on the overcoat layer, and the black matrix formed over the common electrode layer. Alternately, the display device may include a top plate having a substrate, the black matrix formed on the substrate, the microstructure layer formed over the black matrix, the overcoat layer formed on the microstructure layer and a common electrode layer formed on the overcoat layer.

In still other embodiments, the device may include a light diffuser including a material having a birefringence such that a contrast ratio of 50:1 or greater for the display device is achieved. The microstructured layer may include light shaping elements for increasing viewing angle for the display device. The light shaping elements may include at least one of prisms, facets and curves. These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention provides an improved apparatus for eliminating or reducing lateral color shift in direct view displays. In preferred embodiments of the present invention, prisms are integrated inside a liquid crystal (LC) cell to redirect red and blue light perpendicular to the display normal while maintaining the horizontal divergence introduced by a microlens employed in accordance with the invention. In other embodiments, finely structure prisms with curved surfaces or range of angles are employed to further increase the horizontal and/or vertical viewing angles.

In accordance with the present invention, the above stated problems and related problems of the prior art are solved by the use of prisms integrated inside the LC cell to redirect the red and blue light (and green light if needed) perpendicular to the display normal. For example, the use of integrated prisms to redirect the red and blue light solves the lateral color shift problem for the color filterless display, maintains the apparent pixel size, and can provide the amount of diffusion needed to achieve acceptable viewing angles without reducing the ambient contrast ratio. Green light may include a tilt relative to a normal of the display device (e.g., peak green light is tilted less than about ±8 degrees relative to the display normal). The green tilt may also be compensated for in accordance with the present invention.

Prisms can be formed onto the color filter glass, on which a black matrix material has been deposited and patterned, by casting or molding of a ultra-violet (UV) light cured polymer, for example. The polymer may include, for example, KAYARAD (SHD-60) available commercially from Nippon Kayaku Corporation, as a high optical index material (refractive index (n) is about 1.60). The prisms can then be overcoated with a transparent planarizing polymer layer with a different optical index, for example, DESOLITE available commercially from Japan Synthetic Rubber (JSR) as a low optical index material (refractive index (n) is about 1.39), on which a blanket transparent common electrode (e.g., indium tin oxide (ITO)) is deposited. In still other embodiments, the prisms are finely structured to further increase the horizontal and/or vertical viewing angles and to minimize the thickness of the material from which the prisms and facets are formed.

Figure 1:
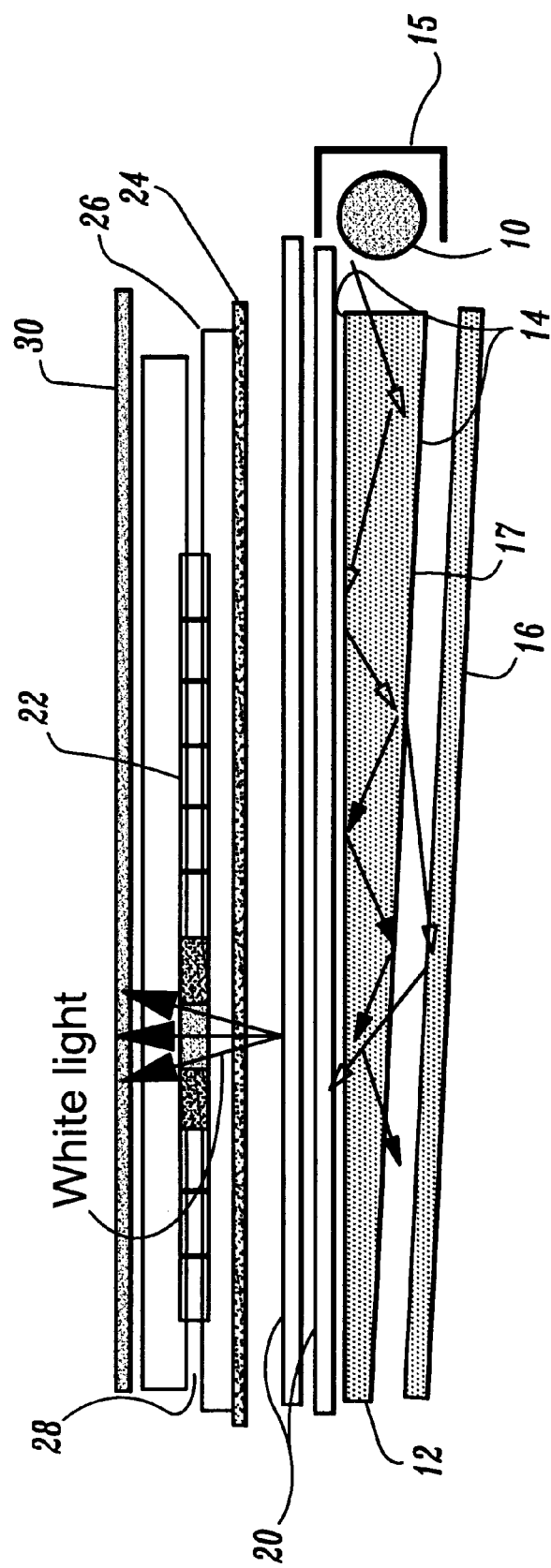
FIG. 1 is a side view of a conventional liquid crystal display and backlight.
Figure 2:
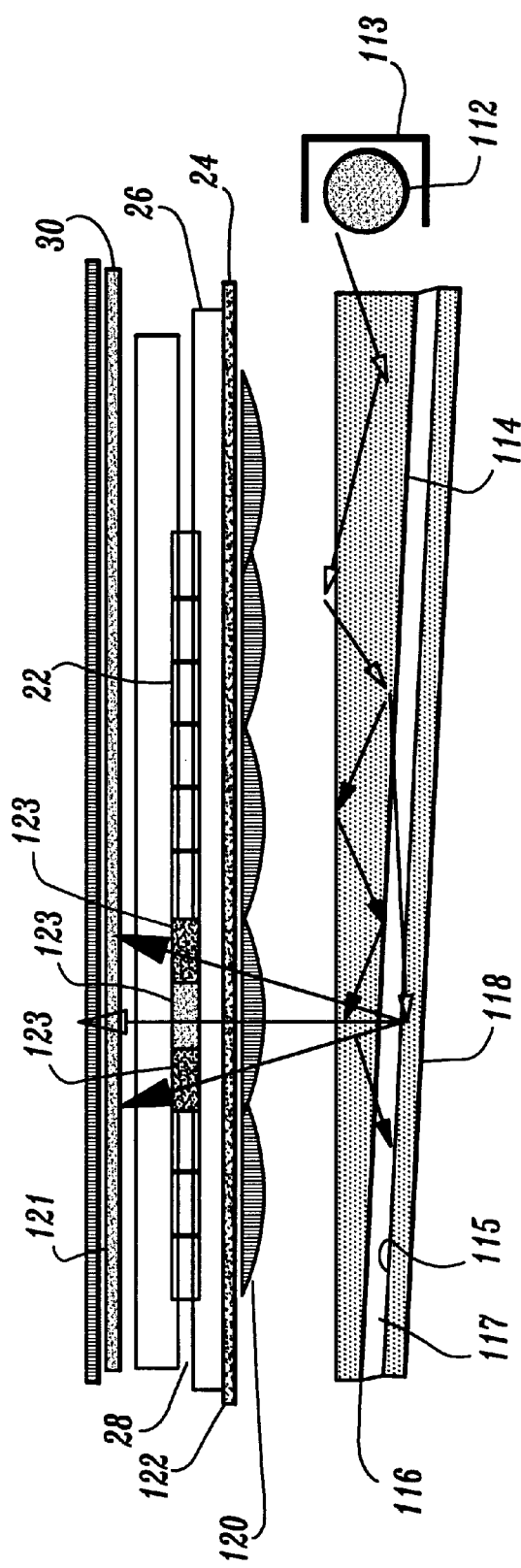
FIG. 2 is a side view of a conventional color filterless liquid crystal display and backlight.
Figure 3:
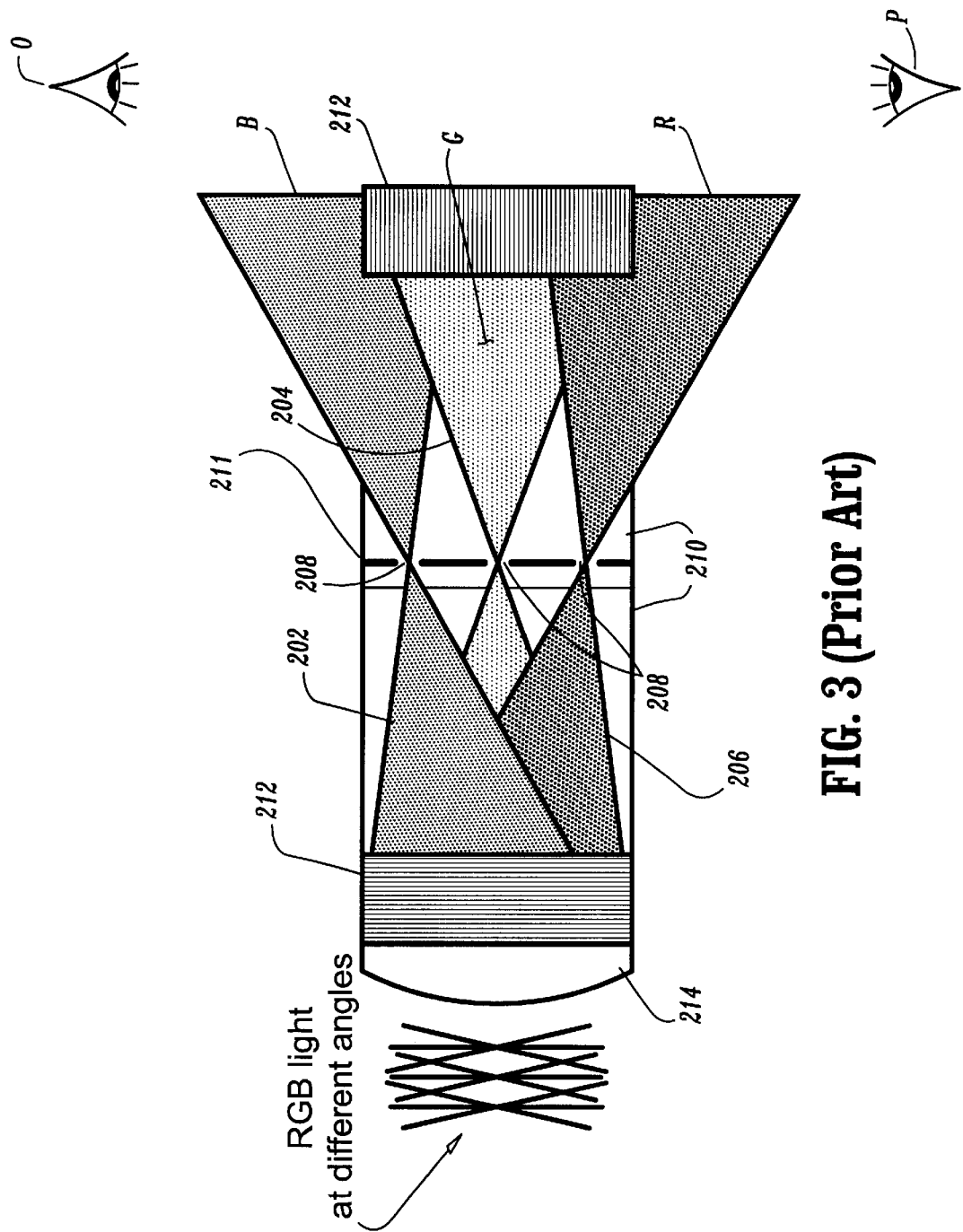
FIG. 3 is a schematic side view of the lenticular lens and a liquid crystal display illustrating the lateral color shift problem.
Figure 4:
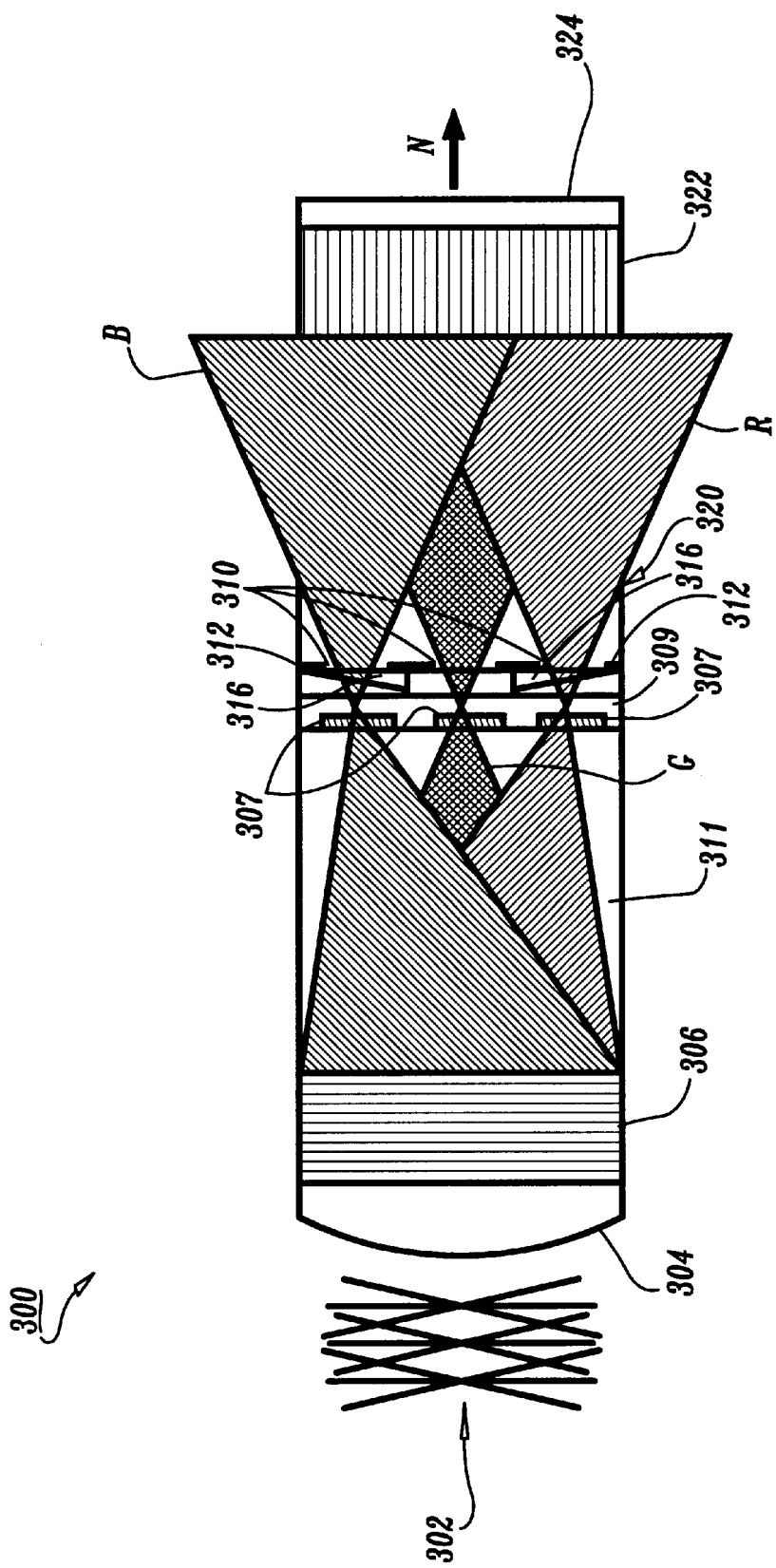
FIG. 4 is a schematic side view where prisms or facets are employed prior to black matrix apertures to redirect light normal to the display in accordance with the present invention.
Figure 5:
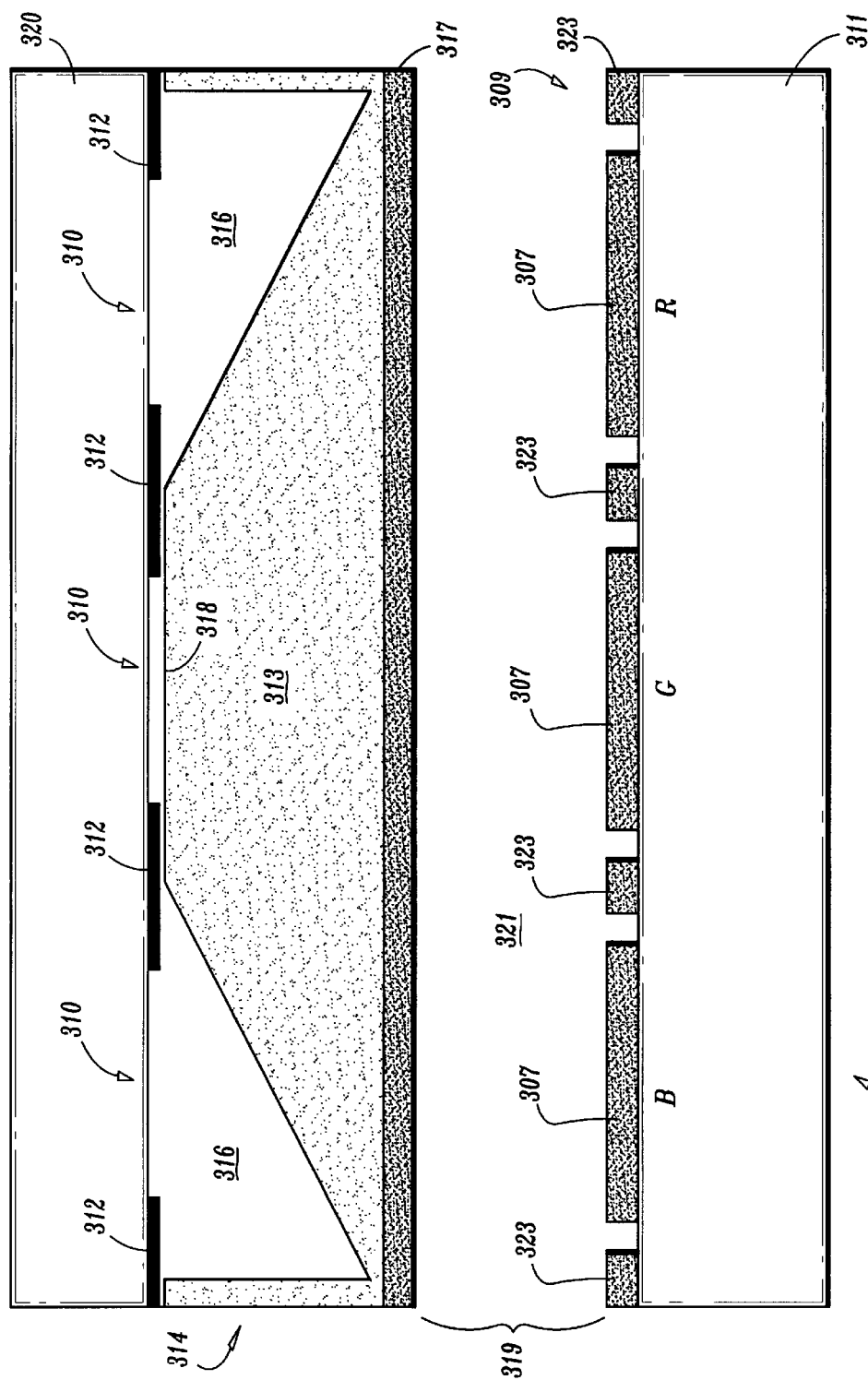
FIG. 5 is a cross-sectional view of a single prism structure for color correction in red and blue sub-pixels in accordance with the present invention.

Referring now in detail to the figures in which like numerals represent the same or similar elements and initially to FIGS. 4 and 5, a schematic side view of a portion of a liquid crystal display device 300 is shown in accordance with the present invention. Device 300 includes light 302 from a light source (e.g., light source 112 of FIG. 2) which has been angularly separated by an optical device, such as, a diffraction grating (not shown), and is incident on lenticular lens 304 and passes through a polarizer 306. Light exiting lens 304 and polarizer 306 is spatially separated into color components, for example, red (R), green (G) and blue (B). Red and blue light are laterally shifted away from the green light (display normal indicated by arrow "N") as the color components pass through sub-pixels 307 in a thin-film transistor array 309 formed on a substrate 311 and then through apertures 310 in a black matrix 312.

A microstructure layer or prism sheet 314 is employed to redirect the red and blue light towards the display normal "N" to fix the lateral color shift problem. Prism sheet 314 may include a plurality of features which may include prisms, facets, curved surfaces, flat surfaces and/or a range of angled surfaces 316. Features of sheet 314 preferably include geometrical features which vary with position on sheet 314. As shown in FIG. 5, sheet 314 includes angled portions 316 for redirecting red and blue light. A center portion 318 is also included which permits light (e.g., green) propagating in the direction of a surface normal to pass therethrough. It is assumed for these examples that green is normal to the display; however, if green were not normal, an additional prism could be employed to redirect green to the normal direction. Portions 316 and 318 are oriented relative to each other in such a way to correct for lateral color shift of red and blue light. In one embodiments, angled portions 316 include a single prism as shown, with a surface inclined by about 45 degrees relative to center portion. Each of portions 316 and 318 may also include facets, curves, prisms or other features which diffuse light to provide wider viewing angles for the display 300.

The geometry of portions 316 and 318, as well as the geometry of features included on portion 316 and 318, for example, angles of the facets or prisms, sizes of the facets or prisms, radius of curved surfaces, etc. may be selected based on the optical index of the material from which the prisms or facets are formed and/or on the optical index of a planarizing overcoat which may have a different optical index (higher or lower).

Figure 6:
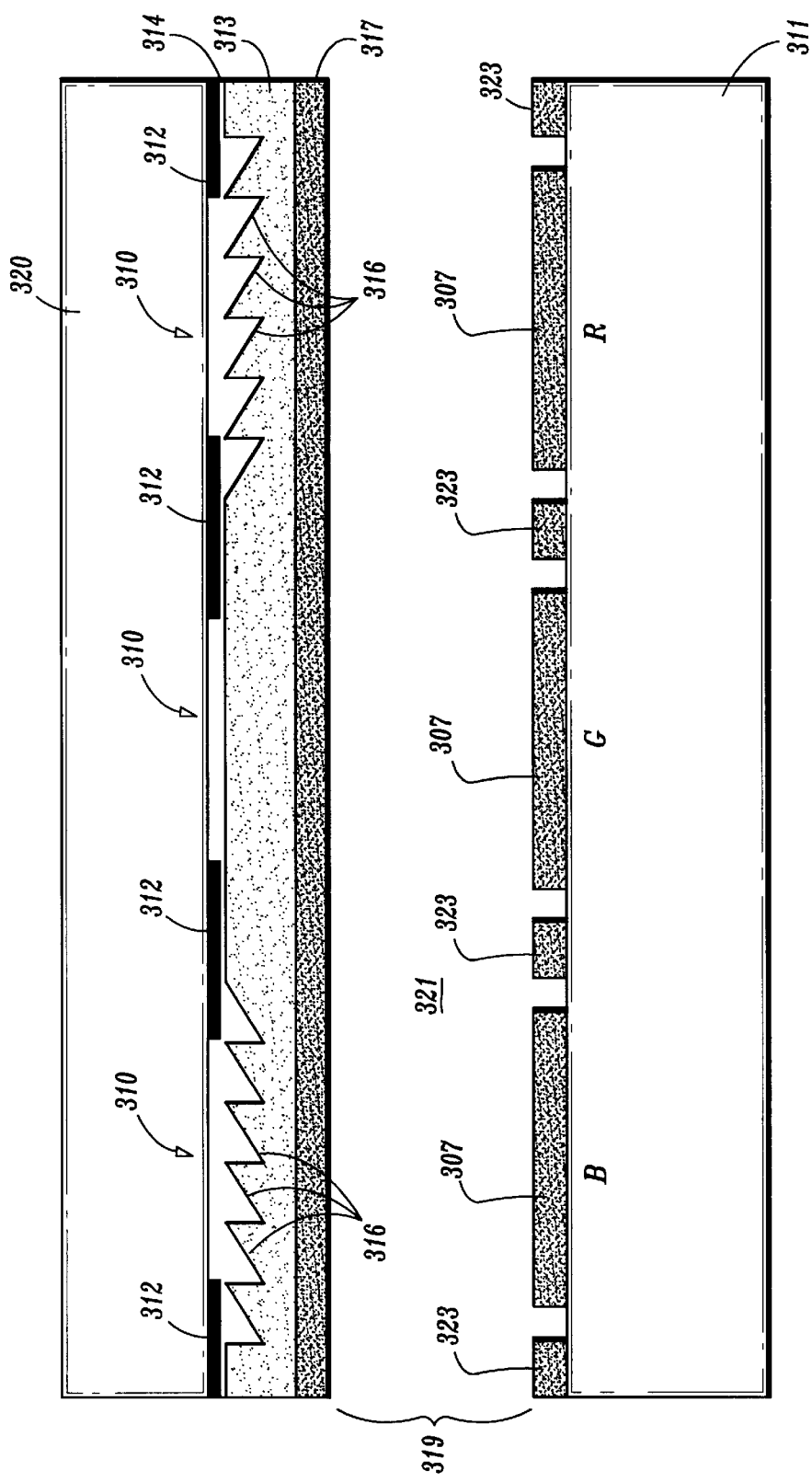
FIG. 6 is a cross-sectional view of a multiple prism structure for color correction in red and blue sub-pixels to reduce the height of the prisms in accordance with the present invention.

Referring to FIG. 5, a detailed cross-section of the embodiment described in FIG. 4 is shown. Note that the prisms 316 are aligned to black matrix openings 310 when prisms 316 are formed. When a single prism is employed for each sub-pixel 307, the thickness of the integrated prisms 316 and a planarizing overcoat layer 313 can be large, e.g., 100 microns. This thickness can be greatly reduced by employing multiple prisms for color correction in the red and blue sub-pixels, as shown, for example, in FIG. 6. The reduction in thickness increases with the number of prisms in each sub-pixel 307. Overcoat layer 313 has a common electrode 317 formed thereon. A gap 319 is filled with liquid crystal 321. Addressing lines 323 are also shown. Referring to FIG. 6, another embodiment of the present invention is shown. A plurality of prisms 316 are integrated in the liquid crystal cell to greatly reduce the thickness of layers 313 and 314. By employing multiple prisms for color correction in the red and blue sub-pixels, reduction in thickness increases with the number of prisms 316 in each sub-pixel 307.

Figure 7:
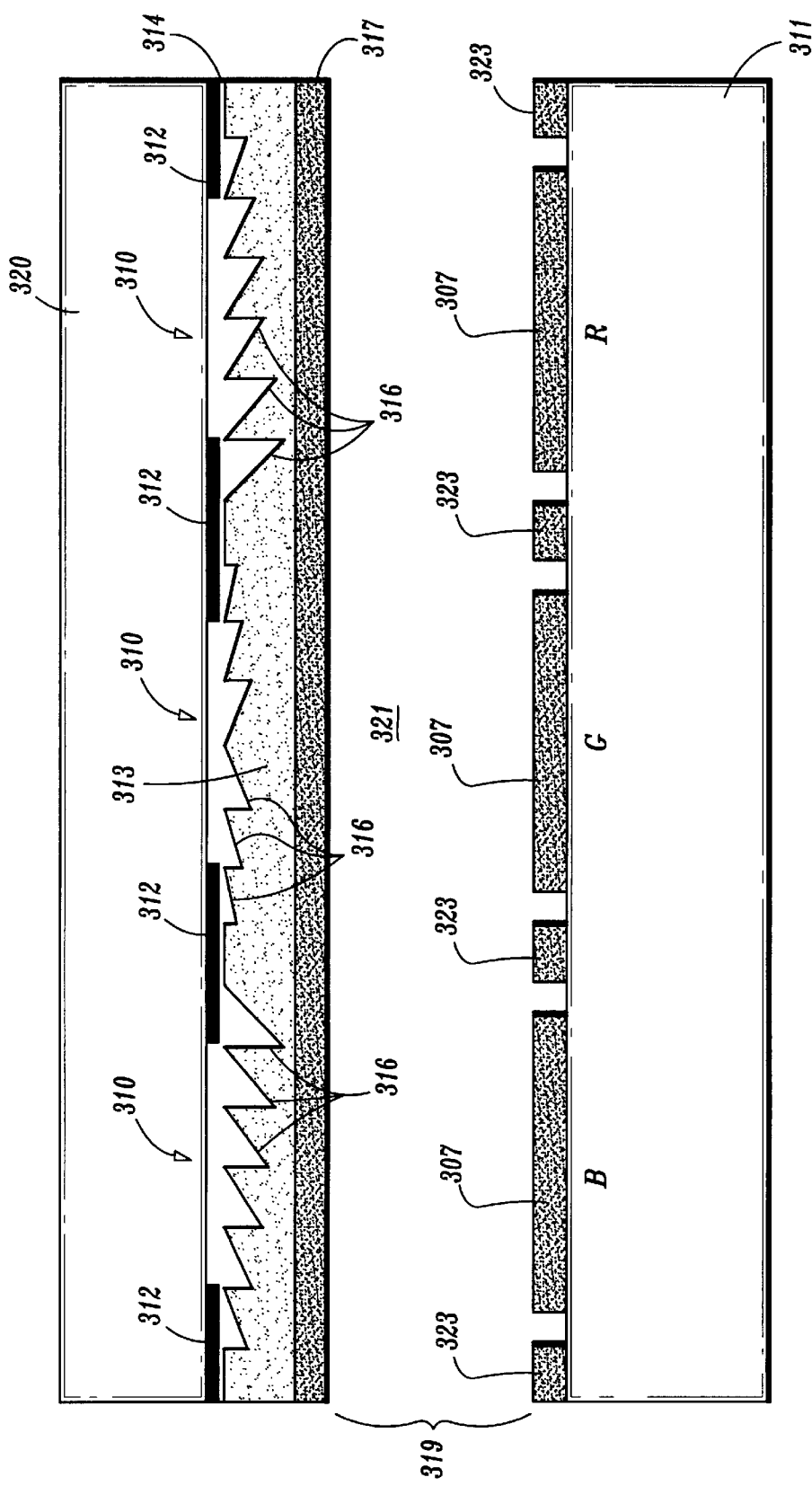
FIG. 7 is a cross-sectional view of a multiple prism structure for color correction and diffusion in each sub-pixel where a range of prism angles are employed to increase horizontal light distribution in accordance with the present invention.
Figure 8:
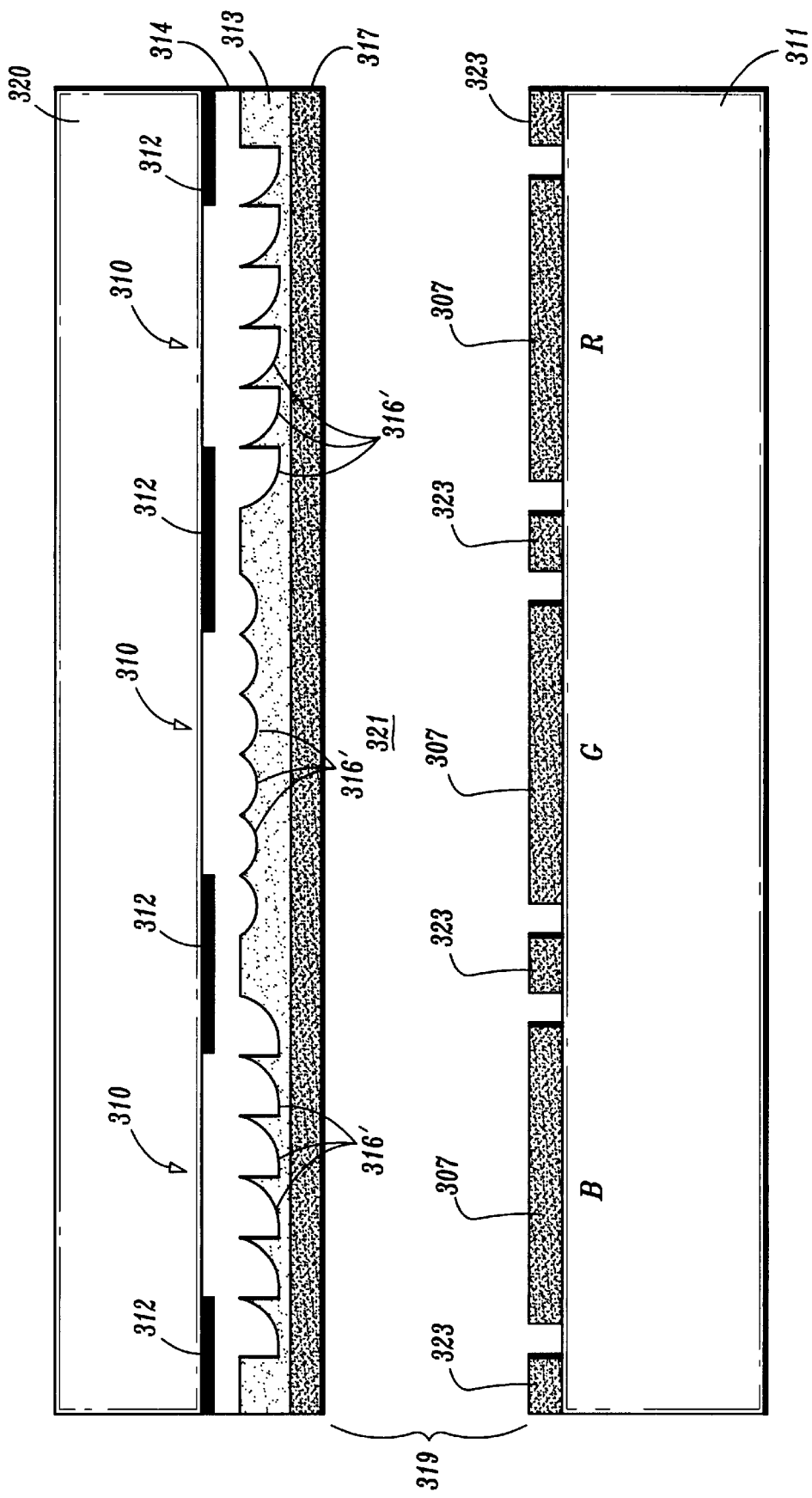
FIG. 8 is a cross-sectional view of a multiple prism structure for color correction and diffusion in each sub-pixel with curved surfaces to increase horizontal light distribution in accordance with the present invention.

To provide additional diffusion of the light in the direction in which the colors are separated, multiple prisms 316 can be formed in each sub-pixel 307 with a range of angles, as shown in FIG. 7. Note that in the embodiment shown in FIG. 7, the green sub-pixel includes prisms 316 to likewise diffuse green light. Additionally, the average tilt angle of the prisms in the red and blue sub-pixels in FIG. 7 are similar to those in FIGS. 5 and 6. Alternately, curved surfaces 316' may be provided for a range of angles in each sub-pixel 307, as shown in FIG. 8. A plurality of curved and angled surfaces 316' may be employed to produce a desired light output distribution.

Figure 9:
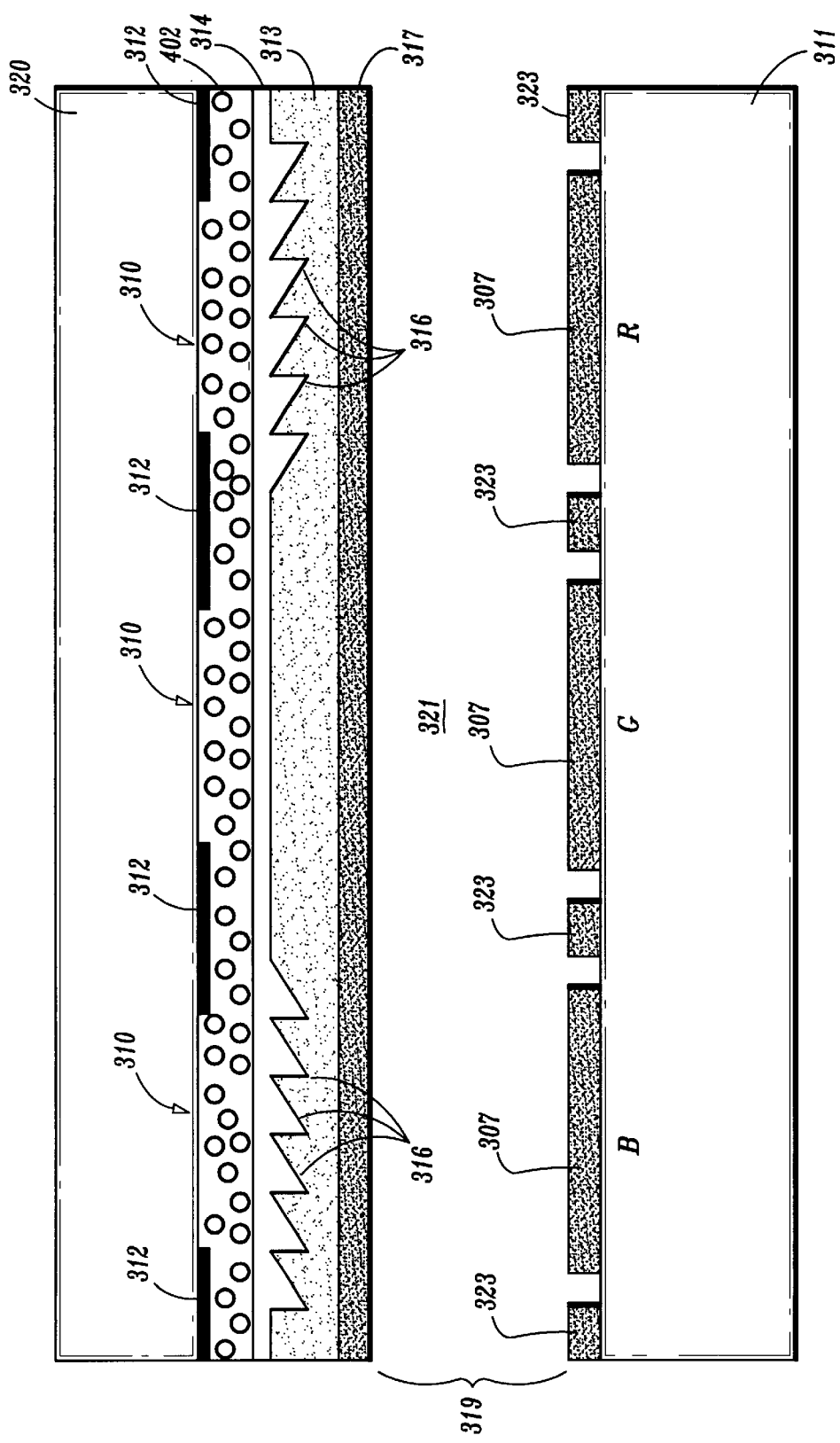
FIG. 9 is a cross-sectional view of a low birefringence diffuser in combination with a multiple prism structure for color correction and diffusion to increase both horizontal and vertical light distribution in accordance with the present invention.
Figure 10:
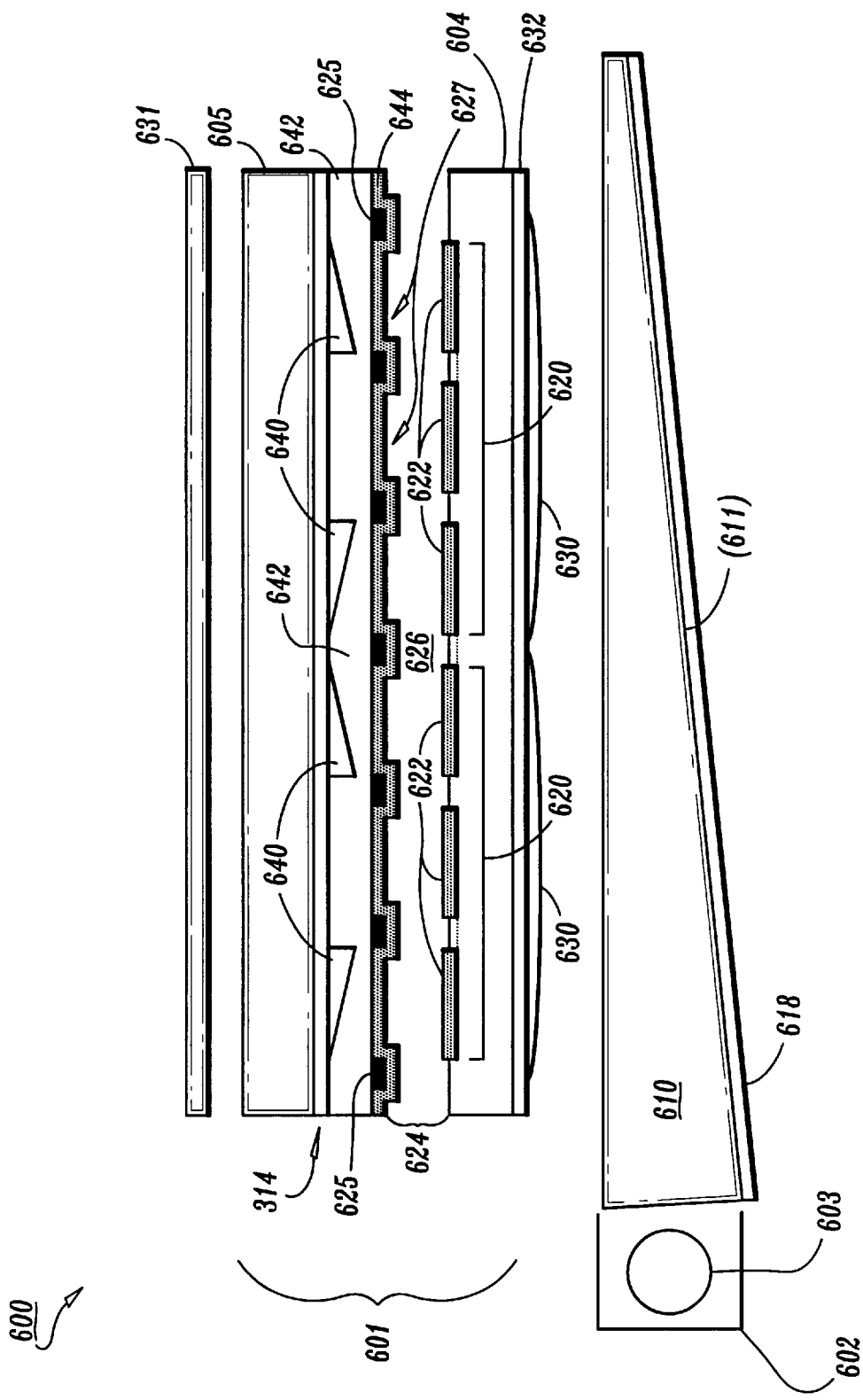
FIG. 10 is a side view of a display structure with a microstructured sheet and a black matrix formed on a common electrode in accordance with the present invention.

Referring to FIG. 9, another embodiment is shown which separates color correction and diffusion functions, but integrates both functions in a liquid crystal cell 400. A low birefringence diffuser 402, described for example, in Mitatake et al. (cited above), is formed on black matrix material 312 and then multiple color correcting prisms 316 are formed on top of this diffuser 402. Alternately, a low birefringence surface hologram diffuser, as described by Jannson et al. (cited above), may be used as diffuser 402. Low birefringence diffuser 402 preferably includes a birefringence low enough to provide a contrast ratio of 50:1 or better for a display device. Prisms (316 or 316') with curved surfaces or other shapes may be employed in combination with a diffusion layer 402, as described above to provide greater diffusion for display devices. Referring to FIG. 10, a cross-sectional view of a liquid crystal display device 600, such as an active matrix liquid crystal display (AMLCD), is shown in accordance with the present invention. It is to be understood that other backlit displays or display types may also be employed in accordance with the present invention. Light source 603 and a reflector 602 direct light into an acrylic light guide 610, which has no printed dot pattern on it so that light can only escape when it's angle of incidence exceeds the critical angle. A low index coating 611 (e.g., an index, n, of about 1.29) on the bottom of guide 610 is used to extract light from guide 610 down onto a reflective diffraction grating 618 which separates the light into colors by angle. The light source 603 may include triband phosphors, so the light produced is mainly in three distinct red, green, and blue (RGB) bands. Display components 601 include substrates 604 and 605, which may be glass, plastic or any other suitable transparent material. Substrate 604 includes thin film transistors (not shown), addressing and other circuitry (not shown) and a plurality of pixels 620. Each pixel 620 includes three sub-pixels 622 (for red green and blue color components). A black matrix 625 is formed with apertures 627 to permit light passing through sub-pixels 622 to pass through apertures 627 and to block other light. Between substrates 604 and 605 is a gap 624 filled with liquid crystal (LC) 626. Between substrate 604 and light guide 610, a lenticular sheet 630 and a polarizer 632 are included, which function to spatially separate the angularly separated light and direct the individual colors into the appropriate sub-pixels and to polarize the light. A sheet 314, such as a prism sheet, may be employed to redirect color components for a color filterless display as described above. Sheet 314 is used to redirect separated RGB light to reduce or eliminate lateral color shifted light (e.g., red and blue components). Integrated prism sheet 314 may further include a plurality of prisms or curved surfaces 640, on a separate low birefringence diffuser sheet, which disperse light to improve viewing angles of the display 600. A front polarizer 631 may also be employed. Other structures or display types, known in the art, may also be employed and benefit from the present invention. If for example, the green light is not normal to the display, a prism may be used to redirect the green light to the display normal.

Prisms or facets of sheet 314 may be formed on the top substrate 605, preferably by a UV casting process which is known in the art and has been described by Jannson et al. in U.S. Pat. No. 5,631,754, incorporated herein by reference. After the prisms have been formed, the substrate 605 may be overcoated with a planarizing material 642 with a different optical index (n), such as, for example, n=1.39 for DESOLITE, available commercially from Japan Synthetic Rubber (JSR)(assuming the index of refraction, n, is about 1.60 for sheet 314).

In one embodiment, if the red and blue light have lateral angles of about 8 degrees, and the optical index of the prism sheet 314 is about 1.60 and of an overcoat material 642 is 1.39, the angle of the prism to direct the light to the display normal is about 45 degrees. Other combinations of angles and refractive indices are also contemplated.

Figure 11:
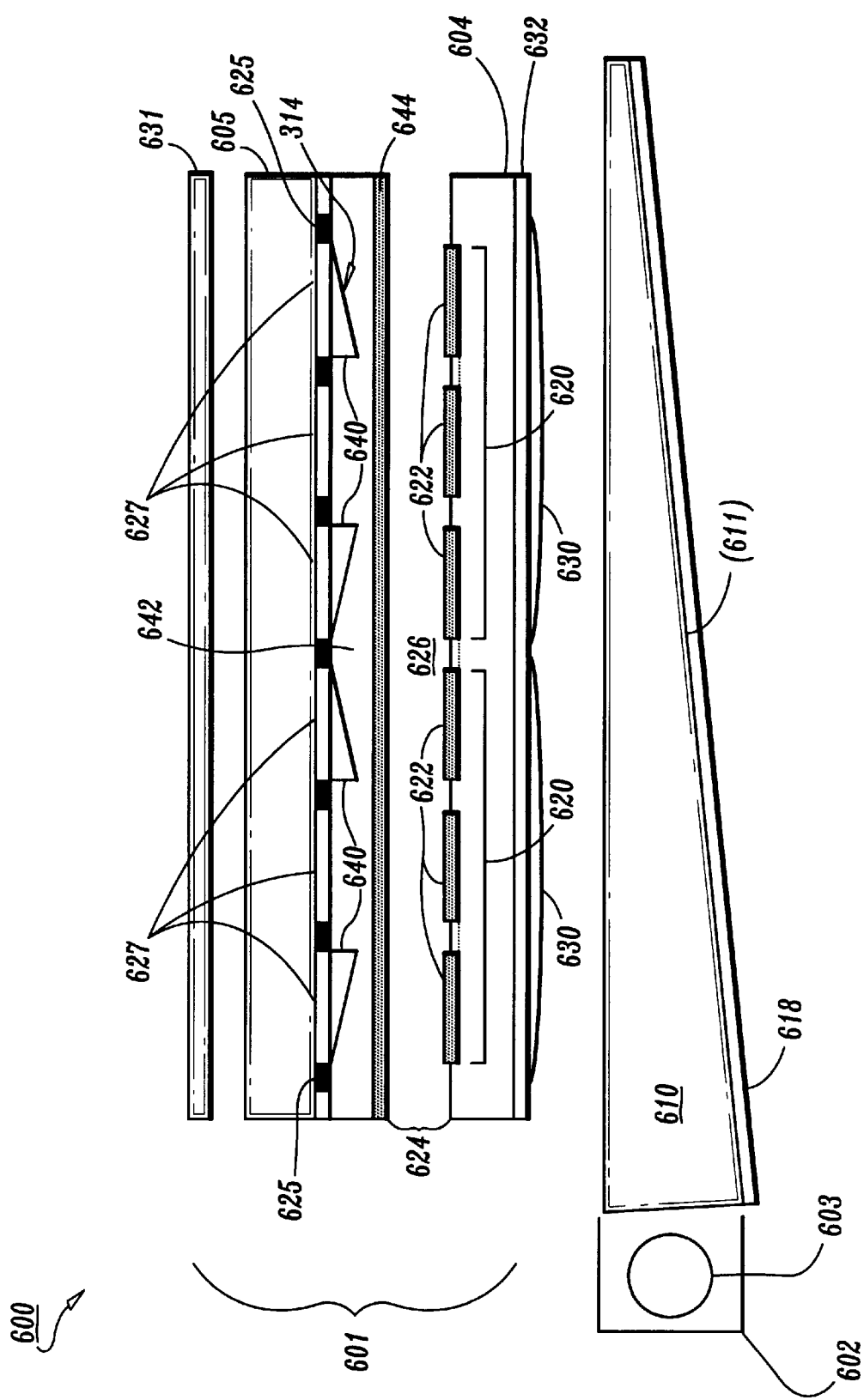
FIG. 11 is a side view of a display structure with a microstructured sheet and a common electrode formed on a black matrix in accordance with the present invention.

Black matrix material 625 is then deposited and patterned where it is aligned to the prism pattern of sheet 314 so the appropriate prisms are centered in the appropriate sub-pixel apertures 627 as shown in FIG. 10. Alternately, the black matrix 625 may be deposited and patterned followed by the formation of prisms in alignment with the openings in the black matrix 625 as shown in FIG. 11. Black matrix formation is followed by a blanket deposition of for example ITO or indium zinc oxide (IZO) to form a transparent common counter electrode 644. The order of the last two steps can be reversed if the etchant used to pattern black matrix material 625 damages the planarizing overcoat polymer 642, but does not damage the ITO of electrode 644.

Note that the prisms 640 in layer 314 and planarizing overcoat 642 preferably include a material with a very low birefringence. The polymer of layer 314 may include, for example, KAYARAD (SHD-60) available commercially from Nippon Kayaku Corporation. Overcoat layer 642 may include a transparent planarizing polymer layer with a different optical index, for example, DESOLITE available commercially from Japan Synthetic Rubber (JSR), to avoid degrading contrast ratio since prisms of sheet 314 are between the polarizers 631 and 632. It is advantageous to have the prisms of prism sheet 314 under common electrode 644 so that there is no voltage drop across the prisms and it is also advantageous to planarize the structure so that a thin cell gap for the LC material can be used which provides a faster response time.

One significant advantage of redirecting the light to improve the viewing angle after the LC layer 626 (by placing sheet 314 on top plate 605) is that the light can traverse the LC layer at a near normal angle of incidence so the LC electro-optical performance is best in terms of contrast ratio and image reversal. For a description of image reversal and contrast of a normal TN display, see "Viewing Angle Enhancement system for LCDs", S. Zimmerman et al., SID '95 Digest pp. 793–796.

Having described preferred embodiments of an integrated faceted prism sheet for improved viewing angle in direct view color filterless liquid crystal displays (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A display device, comprising:
    an array of first optical devices disposed in a light path for spatially separating angularly separated light into color components;
    a pixel array comprising a plurality of pixels, each pixel comprising a plurality of subpixels and each pixel receiving each of the color components through a sub-pixel, each sub-pixel for controlling transmitted light intensity therethrough, wherein a pitch of the pixel array is equal to a pitch of the array of first optical devices;
    a black matrix in operative relationship with the sub-pixels, the black matrix including apertures for receiving the color components; and
    a microstructured layer disposed in the light path of the apertures of the black matrix and receiving light from the array of first optical devices, the microstructured layer including faceted surfaces to redirect laterally shifted color components toward a display normal of the display device.

2. The device as recited in claim 1, wherein the color components include red, green and blue, and the microstructured layer includes a first portion which receives a green component and angled portions inclined relative to the first portion for the red and blue components.

3. The device as recited in claim 1, further comprising an overcoat layer formed on the microstructured layer wherein the optical index of the microstructured layer is different from the optical index of the overcoat layer such that the color components are shifted in accordance with a difference between the optical index of the microstructured layer and the overcoat layer.

4. The device as recited in claim 3, wherein the overcoat layer forms a planar surface over the microstructured layer.

5. The device as recited in claim 3, wherein the display device includes a top plate including:
    a substrate;
    the microstructure layer formed on the substrate;
    a common electrode layer formed on the overcoat layer; and
    the black matrix formed over the common electrode layer.

6. The device as recited in claim 3, wherein the display device includes a top plate including:
    a substrate;
    the black matrix formed on the substrate;
    the microstructure layer formed over the black matrix;
    the overcoat layer formed on the microstructure layer; and
    a common electrode layer formed on the overcoat layer.

7. The device as recited in claim 1, further comprising a light diffuser including a material having a birefringence such that a contrast ratio of 50:1 or greater for the display device is achieved.

8. The device as recited in claim 1, wherein the microstructured layer includes light shaping elements for increasing viewing angle for the display device.

9. The device as recited in claim 8, wherein the light shaping elements include at least one of prisms, facets and curves.

10. A liquid crystal display device, comprising:
    an array of first optical devices disposed in a light path for spatially separating angularly separated light into color components;

a first substrate having a pixel array disposed thereon, each pixel including three sub-pixels for receiving each of the color components through the sub-pixel, wherein a pitch of the pixel array is equal to a pitch of the array of first optical devices;

a second substrate spaced apart from the first substrate by a gap, the gap being filled with liquid crystal material, the second substrate comprising:

a microstructured layer disposed on the second substrate, the microstructured layer including faceted surfaces for redirecting laterally shifted color components shifted by the array of first optical devices, the faceted surfaces for redirecting the laterally shifted light toward a display normal;

a common electrode formed on the microstructured layer; and a black matrix layer including apertures patterned in operative relationship with the sub-pixels for receiving the color components through the sub-pixels.

11. The device as recited in claim 10, wherein the color components include red, green and blue, and the microstructured layer includes a first portion which receives a green component and angled portions inclined relative to the first portion for the red and blue components.

12. The device as recited in claim 10, further comprising an overcoat layer formed on the microstructured layer wherein the optical index of the microstructured layer is different from the optical index of the overcoat layer such that the color components are shifted in accordance with a difference between the optical index of the microstructured layer and the overcoat layer.

13. The device as recited in claim 12, wherein the overcoat layer forms a planar surface over the microstructured layer.

14. The device as recited in claim 10, further comprising a light diffuser including a material having a birefringence such that a contrast ratio of 50:1 or greater for the display device is achieved.

15. The device as recited in claim 10, wherein the microstructured layer includes light shaping elements for increasing viewing angle for the display device.

16. The device as recited in claim 15, wherein the light shaping elements include at least one of prisms, facets and curves.

17. A display device, comprising:

an array of first optical devices disposed in a light path for spatially separating angularly separated light into color components;

a pixel array comprising a plurality of pixels, each pixel comprising a plurality of subpixels and each pixel receiving each of the color components through a sub-pixel, each sub-pixel for controlling transmitted light intensity therethrough, wherein a pitch of the pixel array is equal to a pitch of the array of first optical devices;

a black matrix in operative relationship with the sub-pixels, the black matrix including apertures for receiving the color components after the pixel; and a microstructured layer disposed in the light path of the apertures of the black matrix, the microstructured layer including first faceted surfaces for redirecting laterally shifted color components shifted by the array of first optical devices, the microstructured surface including a plurality of surfaces including at least one of facets, curves and angles surfaces to provide increased viewing angles for the display device.

18. The device as recited in claim 17, wherein the color components include red, green and blue, and the first faceted surfaces include a first portion which receives a green component and angled portions inclined relative to the first portion for the red and blue components.

19. The device as recited in claim 17, further comprising an overcoat layer formed on the microstructured layer wherein the optical index of the microstructured layer is different from the optical index of the overcoat layer such that the color components are shifted in accordance with a difference between the optical index of the microstructured layer and the overcoat layer.

20. The device as recited in claim 19, wherein the overcoat layer forms a planar surface over the microstructured layer.

21. The device as recited in claim 19, wherein the display device includes a top plate including:

a substrate;

the microstructure layer formed on the substrate;

a common electrode layer formed on the overcoat layer; and the black matrix formed over the common electrode layer.

22. The device as recited in claim 19, wherein the display device includes a top plate including:

a substrate;

the black matrix formed on the substrate;

the microstructure layer formed over the black matrix;

the overcoat layer formed on the microstructure layer; and a common electrode layer formed on the overcoat layer.

23. The device as recited in claim 17, further comprising a light diffuser including a material having a birefringence such that a contrast ratio of 50:1 or greater for the display device is achieved.

24. The device as recited in claim 17, wherein the plurality of faceted regions redirect the color components into a plurality of different directions.

25. The device as recited in claim 17, wherein the faceted regions include at least one of prisms, facets and curves.

26. A display device, comprising;

a first optical device disposed in a light path for spatially separating angularly separated light into color components;

a pixel receiving each of the color components through a sub-pixel, each sub-pixel for controlling transmitted light intensity therethrough;

a black matrix in operative relationship with the sub-pixels, the black matrix including apertures for receiving the color components; and a microstructured layer disposed in the light path of the apertures of the black matrix and receiving light from the first optical device, the microstructured layer including faceted surfaces to redirect laterally shifted color components toward a display normal of the display device, wherein the color components include red, green and blue, and wherein the microstructured layer includes a first portion which receives a green component and angled portions inclined relative to the first portion for the red and blue components.

* * * * *